United States Patent
Yin et al.

(10) Patent No.: US 8,316,004 B2
(45) Date of Patent: Nov. 20, 2012

(54) SPEECH RETRIEVAL APPARATUS AND SPEECH RETRIEVAL METHOD

(75) Inventors: Yueyan Yin, Beijing (CN); Yaojie Lu, Beijing (CN); Dafei Shi, Beijing (CN); Jichuan Zheng, Beijing (CN); Lijun Zhao, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 12/910,148

(22) Filed: Oct. 22, 2010

(65) Prior Publication Data
US 2011/0131236 A1   Jun. 2, 2011

(30) Foreign Application Priority Data
Nov. 27, 2009   (CN) .......................... 2009 1 0249847

(51) Int. Cl.
*G06F 7/00* (2006.01)
*G06F 17/30* (2006.01)
(52) U.S. Cl. .......................................... 707/706; 704/7
(58) Field of Classification Search .................. 707/706; 704/7
See application file for complete search history.

(56) References Cited

U.S. PATENT DOCUMENTS

| | | | |
|---|---|---|---|
| 7,526,425 B2 | 4/2009 | Marchisio et al. | |
| 7,542,996 B2 | 6/2009 | Fanning et al. | |
| 7,680,853 B2 * | 3/2010 | Yu et al. | 707/708 |
| 7,809,568 B2 * | 10/2010 | Acero et al. | 704/257 |
| 2006/0206324 A1 | 9/2006 | Skilling et al. | |
| 2008/0270110 A1 * | 10/2008 | Yurick et al. | 704/3 |
| 2009/0063151 A1 | 3/2009 | Arrowood et al. | |

OTHER PUBLICATIONS

Extended European Search Report issued Mar. 22, 2011, in Patent Application No. 10251818.0.
Gal Chechik, et al., "Large-Scale Content-Based Audio Retrieval from Text Queries", Proceedings of the 2008 ACM International Conference on Multimedia With Co-Located Symposium & Workshops, XP 2588892, Oct. 30, 2008, pp. 105-112.
S. J. Young, et al., "Acoustic Indexing for Multimedia Retrieval and Browsing", IEEE International Conference on Acoustics, Speech, and Signal Processing, vol. 1, XP 10226169, Apr. 21, 1997, pp. 199-202.

* cited by examiner

*Primary Examiner* — Charles Lu
(74) *Attorney, Agent, or Firm* — Oblon, Spivak, McClelland, Maier & Neustadt, L.L.P.

(57) ABSTRACT

Disclosed are a speech retrieval apparatus and a speech retrieval method for searching, in an audio file database, for one or more target audio files by using one or more input search terms. The speech retrieval apparatus comprises a related document obtaining unit configured to search, in a related document database where documents related to audio files in the audio file database are stored, for one or more related documents by using the search terms; a correspondence audio file obtaining unit configured to search, in the audio file database, for one or more correspondence audio files corresponding to the obtained related documents; and a speech-to-speech search unit configured to search, in the audio file database, for the target audio files by using the obtained correspondence audio files.

8 Claims, 4 Drawing Sheets

SPEECH RETRIEVAL APPARATUS AND SPEECH RETRIEVAL METHOD

BACKGROUND OF THE INVENTION

1. Field of the Invention

The present invention relates to speech retrieval, and more particularly relates to speech retrieval using related documents.

2. Description of the Related Art

In recent years, research and development on speech retrieval systems has been becoming an increased center of focus.

In general, users want to search for interesting audio files by using characters; however, since character format and audio format are entirely different, it is impossible to directly carry out this kind of search.

In conventional speech retrieval systems, characters (i.e. search terms) and search targets (i.e. audio files) are converted into the same format in most cases. For example, the search terms are converted into audio format, the search targets are converted into text format, or the two are converted into the same third format. However, since speech is polyvariant, these kinds of conversions may cause severe loss of information.

More particularly, there are a few well-used speech retrieval methods as follows.

The first speech retrieval method (i.e. the most well-used speech retrieval method) is converting speech into text by auto speech recognition and then making a search by a text retrieval system. This also is the speech retrieval method which is used in the speech retrieval systems of Google™ and SpeechBot™. This speech retrieval method is helpful to understand contents of audio files by reading the text. However, there are a few drawbacks in this speech retrieval method. First, accuracy of the auto speech recognition is low. In the text obtained by the auto speech recognition, there are many errors that cause accuracy of search results to be low. Second, a lot of information contained in audio files themselves, such as context information as well as emotion, speaking speed, and rhythm of a speaker, is lost. Third, as for some special pronunciations, for example, pronunciations of the Chinese-style English, if there are not big amounts of training data by which an appropriate acoustic model can be obtained, this speech retrieval method cannot work normally at all.

The second speech retrieval method is translating (i.e. converting) speech and text into the same third format such as a phonemic code format, a syllable format, a sub-word format, or a word format, and then using the translated text to search for the translated speech. However, there are a few drawbacks in this speech retrieval method too. First, accuracy of translation is not high. Second, this speech retrieval method often brings confusion. For example, in a case where the two are converted into the phonemic code format, if a user wants to search for "information", search results including "attention", "detection", etc., may be obtained because they have a common pronunciation "-tion". Aside from these two drawbacks, this speech retrieval method also has the above-mentioned drawbacks of the first speech retrieval method.

The third speech retrieval method is only using related documents of speech to make a general search for information. This speech retrieval method is usually used in searching for music. Since related documents of speech include less information than the speech itself does in general and contents of the speech itself are difficult to be used in this speech retrieval method, the amount of information used in this speech retrieval method is very small.

Cited reference No. 1: U.S. Pat. No. 7,526,425B2
Cited reference No. 2: U.S. Pat. No. 7,542,996B2

SUMMARY OF THE INVENTION

The disadvantages of the prior art are overcome by the present invention.

According to one aspect of the present invention, a speech retrieval apparatus, which is used for searching for one or more target audio files in an audio file database by using one or more input search terms, is provided. The speech retrieval apparatus comprises a related document obtaining unit configured to search, in a related document database where documents related to audio files in the audio file database are stored, for one or more related documents by using the search terms; a correspondence audio file obtaining unit configured to search, in the audio file database, for one or more correspondence audio files corresponding to the obtained related documents; and a speech-to-speech search unit configured to search for the target audio files in the audio file database by using the obtained correspondence audio files.

According to another aspect of the present invention, a speech retrieval method, which is used for searching for one or more target audio files in an audio file database by using one or more input search terms, is provided. The speech retrieval method comprises a related document obtaining step for searching, in a related document database where documents related to audio files in the audio file database are stored, for one or more related documents by using the search terms; a correspondence audio file obtaining step for searching, in the audio file database, for one or more correspondence audio files corresponding to the obtained related documents; and a speech-to-speech search step for searching the target audio files in the audio file database by using the obtained correspondence audio files.

By using the speech retrieval apparatus and the speech retrieval method described in embodiments of the present invention, it is possible to directly convert a search condition of text format into a search condition of audio format without translation; therefore information loss and other unnecessary loss caused by the translation can be avoided. Since it is not necessary to carry out any speech recognition, negative influence caused by low accuracy of recognition can be avoided too. Further, since a speech-to-speech search is ultimately carried out, as much as possible of speech features can be reserved and utilized in the speech retrieval method. Additionally, the advantage of high accuracy of text-to-text search and speech-to-speech search can be efficiently utilized. And by using the speech-to-speech search, the advantage of high recall, which may be realized in any conventional speech-to-speech systems, can be utilized too.

DETAILED DESCRIPTION OF THE PREFERRED EMBODIMENTS

Hereinafter, the embodiments of the present invention will be concretely described with reference to the drawings. It should be noted that the same symbols, which are in the specification and the drawings, stand for constructional elements having the basically-same function and structure, and repeated explanations for the constructional elements are omitted.

The below description is carried out in order of: (1) a functional layout of a speech retrieval apparatus, (2) a brief working process of a speech retrieval system, and (3) a flowchart of a speech retrieval method.

(1) A Functional Layout of a Speech Retrieval Apparatus

Figure 1:
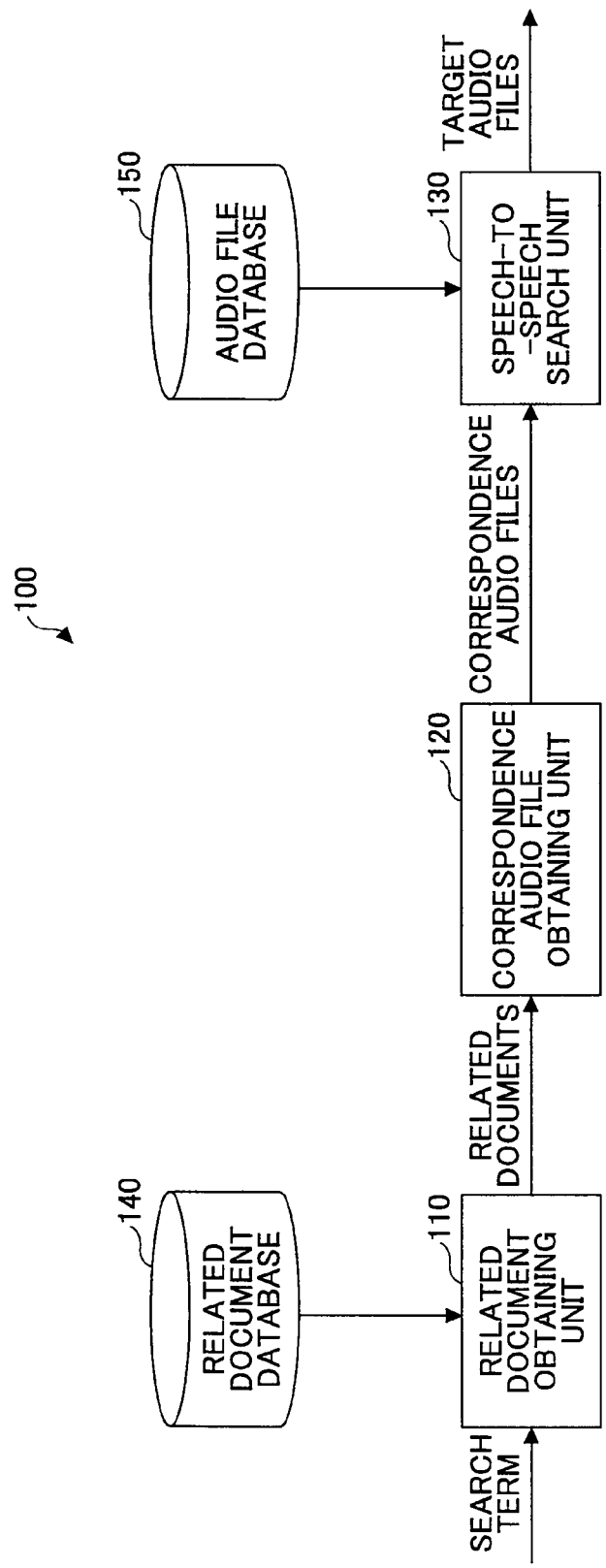
FIG. 1 illustrates a functional layout of a speech retrieval apparatus according to an embodiment of the present invention.

FIG. 1 illustrates a functional layout of a speech retrieval apparatus 100 according to an embodiment of the present invention.

As shown in FIG. 1, the speech retrieval apparatus 100 may comprise a related document obtaining unit 110, a correspondence audio file obtaining unit 120, and a speech-to-speech search unit 130. The speech retrieval apparatus 100 may further comprise a related document database 140 and an audio file database 150. Alternatively, the speech retrieval apparatus 100 may be configured separate from the related document database 140 and the audio file database 150; in this case, the speech retrieval apparatus 100 may communicate with the related document database 140 and the audio file database 150 via a wired network, a wireless network, etc.

In the audio file database 150, audio files having various formats such as ".wav", ".mp3", and ".rm" are stored. Each audio file may include one or more related documents. The related documents may be any text data related to the audio files, for example, titles of the audio files, presentation documents of the audio files, or text contents of the audio files, etc.; however, the related documents are not limited to these kinds of text data. The related documents are stored in the related document database 140. Correspondence relationships of the audio files and their related documents need to be stored so that it is possible to refer to the correspondence audio files according to the related documents or refer to the related documents according to the audio files. The above-mentioned correspondence relationships may be created by using, for example, pointers or indexes, and may be stored in any one of the related document database 140, the audio file database 150, a third database, etc., or a combination of them.

The related document obtaining unit 110 is configured to search, in the related document database 140, for one or more related documents by using one or more search terms. The search terms may be input by a user according to various methods; for example, they may be predetermined or chosen from plural given objects as the search engine of Google™ or Baidu™ does. The search terms may be one or more keywords, one or more sentences, and even one or more documents. The related documents may be obtained by any conventional text retrieval methods. Results, which are obtained when the related document obtaining unit 110 makes a search in the related document database 140, may include related documents ranked in top n (n is an integral number greater than zero) according to degrees of correlation between the related documents and the search terms. The degrees of correlation between the related documents and the search terms may be calculated according to any conventional degree-of-correlation calculation methods such as those using BM25, a vector model, etc.

The correspondence audio file obtaining unit 120 is configured to search, in the audio file database 150, for one or more correspondence audio files corresponding to the obtained related documents by using correspondence relationships between the audio files and the related documents. It should be noted that since one audio file may correspond to plural related documents, there may be a case where the obtained related documents all point to the same audio file. In this case, the audio file, to which the obtained related documents point plural times, may be given a relatively-great weight (or a relatively-high score) as particularly described below.

The speech-to-speech search unit 130 is configured to make a search, in the audio file database 150, for one or more target audio files by using the obtained correspondence audio files. It should be noted that in a case where there are more than one obtained correspondence audio file, the search may be carried out by using degrees of correlation between the entirety of the obtained correspondence audio files and the respective audio files in the audio file database 150, or may be carried out, as particularly described below, by using speech segments in a speech segment collection which is obtained by dividing each of the obtained correspondence audio files into the speech segments. Any speech retrieval methods using speech segments, for example, the method disclosed in the cited reference No. 2, etc., may be used in the embodiments of the present invention.

Figure 2:
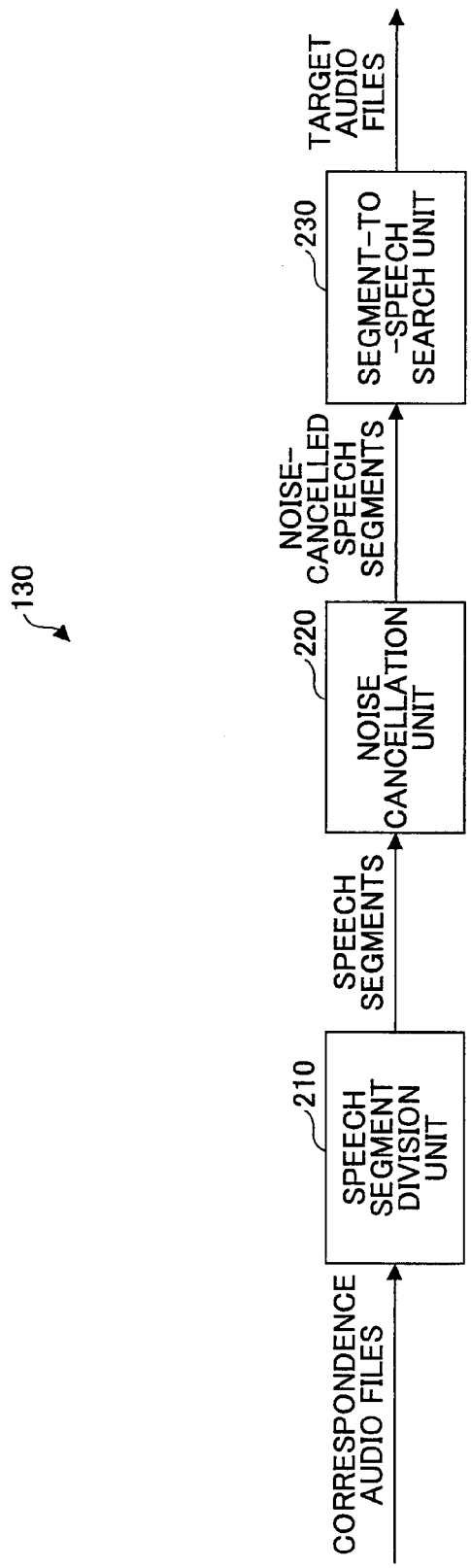
FIG. 2 illustrates a functional layout of a speech-to-speech search unit in the speech retrieval apparatus shown in FIG. 1.

FIG. 2 illustrates a functional layout of the speech-to-speech search unit 130 in the speech retrieval apparatus 100 shown in FIG. 1.

As shown in FIG. 2, the speech-to-speech search unit 130 may comprise a speech segment division unit 210 configured to obtain a speech segment collection by dividing each of the obtained correspondence audio files into speech segments; a noise cancellation unit 220 configured to cancel noise, i.e., one or more speech segments, which are not related to the search terms, in the speech segment collection by using the search terms; and a segment-to-speech search unit 230 configured to search, in the audio file database 150, for the target audio files by using the noise-cancelled speech segment collection.

The speech segment division unit 210 may use any conventional speech segment division methods to divide the audio files into the speech segments. For example, a pause-based division method may be used; here, the pause refers to a rest, hesitation, or temporary stop between two sentences or two phrases when a human being speaks. By recognizing the pause, speech can be divided into speech segments. Again, for example, a speaker-based division method may be used; here, the speaker refers to one of plural persons who talk together. Since speech sounds of different persons have different features, the speech can be divided into speech segments by recognizing the features. Further, a combination of the pause-based division method and the speaker-based division method may be used too. For example, first, the speaker-based division method is carried out, and then the pause-based division method is carried out for dividing the results, obtained by carrying out the speaker-based division method, into speech segments. In addition, if the divided speech segments are considered too small, it is also possible to combine the divided speech segments properly. It should be noted that the above-mentioned speech segment division methods are only for explaining the embodiments of the present invention, and any possible speech segment division methods can be employed here too.

The noise cancellation unit 220 uses the search terms to cancel noise; the noise refers to one or more speech segments which are not related to the search terms. For example, those speech segments, having degrees of correlation greater than a predetermined threshold value, can be considered to be noise; here, the degrees of correlation refer to those between the speech segments and the search terms. As for calculating the degrees of correlation between the speech segments and the search terms, any degree-of-correlation calculation methods used in the conventional speech retrieval methods can be employed. For example, it is possible to use any auto-speech recognition engines to translate all the speech segments in the speech segments collection into texts, and then calculate the degrees of correlation between the translated texts and the search terms. Of course, as an alternative method, it is possible to translate the search terms into speech, and then calculate the degrees of correlation between the translated speech and the respective speech segments in the speech segment collection. Or, as an alternative method, it is also possible to translate the search terms and all the speech segments in the speech segment collection into a third format, and then calculate the degrees of correlation between the two. As an example of the third format, there is a phonemic code format, a syllable format, a sub-word format, or a word format. After the degrees of correlation between the search terms and the respective speech segments are obtained, the degrees of correlation are compared to a predetermined threshold value. If the degrees of correlation are greater than the predetermined threshold value, the speech segments corresponding to the degrees of correlation are reserved; otherwise the speech segments are considered noise and then cancelled. Of course, as an alternative method, it is possible to rank the respective speech segments according to the degrees of correlation between the search terms and the respective speech segments, and then chose the speech segments ranked in top n as final speech segments used for the next search.

(2) A Brief Working Process of a Speech Retrieval System

In order to describe the present invention more efficiently, a brief working process of a speech retrieval system according an embodiment of the present invention is introduced as follows.

Figure 3:
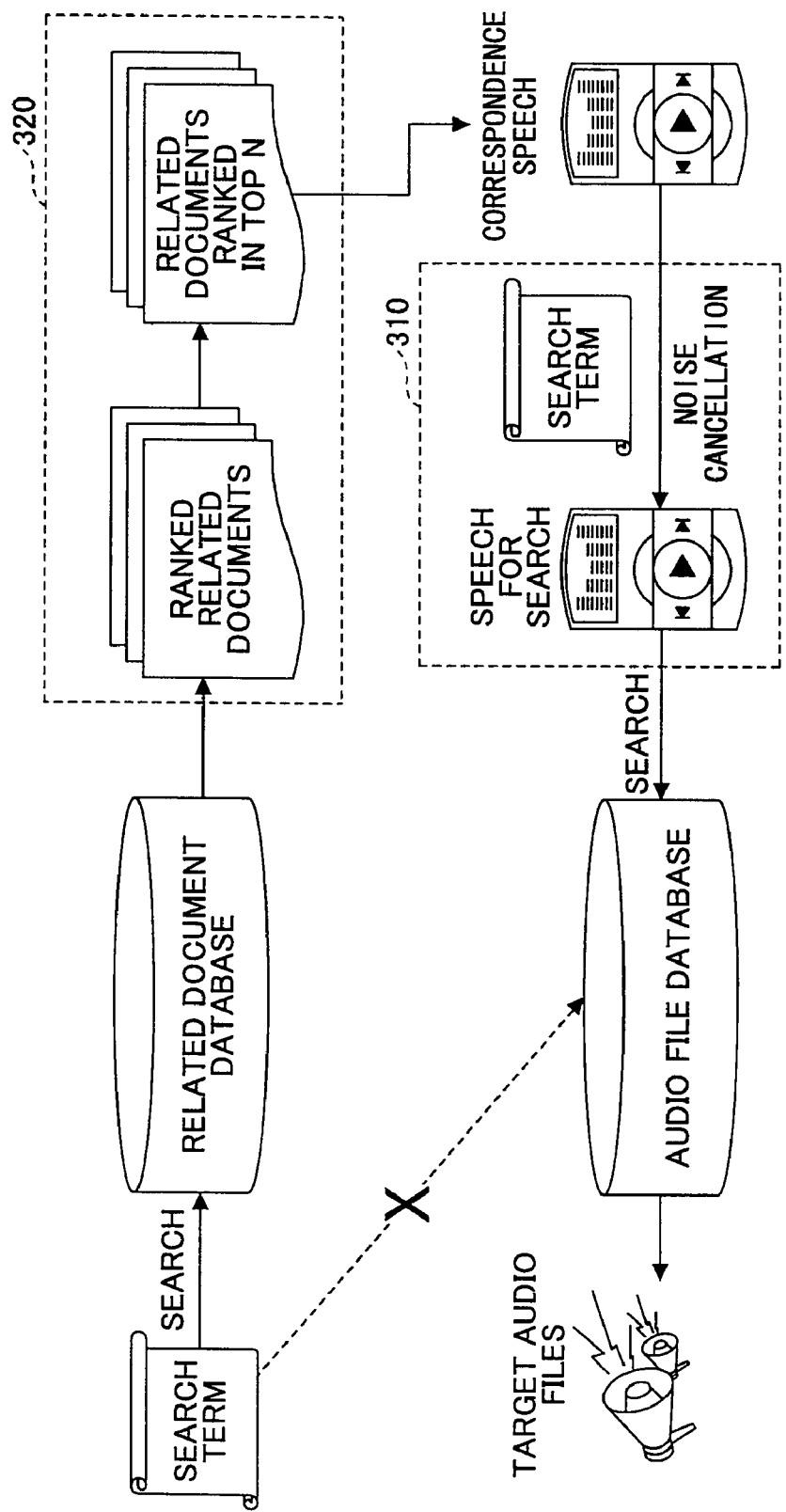
FIG. 3 illustrates a brief working process of a speech retrieval system according to an embodiment of the present invention.

FIG. 3 illustrates a brief working process of a speech retrieval system.

As the working process indicated by arrows in FIG. 3 shows, first, one or more search terms, which are, for example, input by a user, are used to search for one or more related documents. In this way, the advantage of high accuracy of the text-to-text search can be utilized. Second, the ranked related documents are obtained according to degrees of correlation between the related documents and the search terms, and then the related documents ranked in top n are obtained. Next, one or more correspondence audio files corresponding to the related documents ranked in top n are obtained. Here, it should be noted that after obtaining the correspondence audio files, it is possible to use the search terms to deal with the obtained correspondence audio files, for example, cancel noise, i.e., one or more speech segments which are not related to the search terms. By this way, in the speech-to-speech search mentioned below, search efficiency can be improved, negative influence of noise can be removed, and search accuracy can be improved. After canceling the noise, speech used for the next search is obtained. Then, by using the speech used for the next search to make a search in the audio file database, one or more target audio files can be obtained and output.

A single-ended arrow with a dotted line and "X" in FIG. 3 indicates that, as the background of the present invention describes, it is impossible to directly make a search in the audio file database by using the search terms. Further, there are many conventional retrieval techniques by which it is possible to make a search in a related document database by using one or more search terms or in an audio file database by using speech, and accuracy of the search is high. As a comparison, the speech retrieval method in the embodiment of the present invention is as follows: first, one or more related documents are obtained by using one or more search terms to search in the related document database; second, one or more correspondence audio files are directly obtained by using the obtained one or more related documents; third, one or more target audio files are obtained by using the obtained one or more correspondence audio files. Therefore, by this way, loss of information when making a translation between texts and speech as well as negative influence caused by low accuracy of the translation can be avoided.

It should be noted that the brief working process shown in FIG. 3 is just for providing a better understanding of the embodiments of the present invention, not for limiting the technical scope of the present invention. In other words, some parts shown in FIG. 3 may be omitted or replaced by other means. For example, the part surrounded by dotted frame 310, i.e. the part used for canceling noise, can be omitted. And the part surrounded by dotted frame 320 can be replaced by other means, for example, by considering related documents having degrees of correlation greater than a predetermined threshold value such as 50% as the obtained related documents; here, the degrees of correlation refer to those between the related documents and the search terms.

(3) A Flowchart of a Speech Retrieval Method

Figure 4:
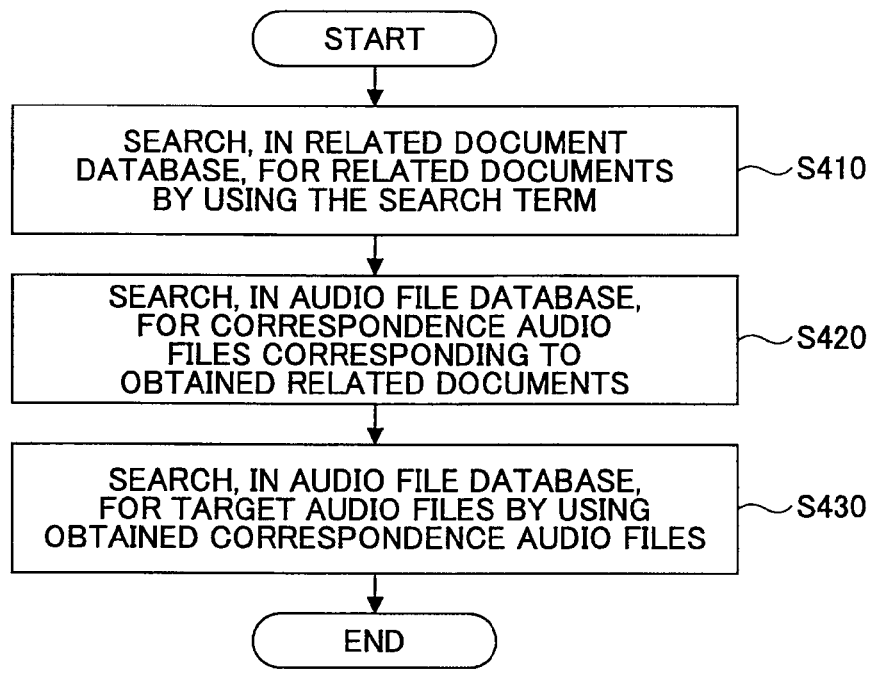
FIG. 4 illustrates a flowchart of a speech retrieval method according to an embodiment of the present invention.

In what follows, first, an overall speech retrieval method according to an embodiment of the present invention is described based on FIG. 4, and then a speech retrieval method including a noise cancellation process according to a preferred embodiment of the present invention is explained in detail.

As shown in FIG. 4, in step S410, one or more search terms are used for searching, in a related document database where documents related to audio files in an audio file database are stored, for one or more related documents; in step S420, the obtained related documents are used for searching, in the audio file database, for one or more correspondence audio files corresponding to the obtained related documents; and in step S430, the obtained correspondence audio files are used for searching, in the audio file database, for one or more target audio files.

According to a preferred embodiment, step S430 (i.e. the obtained correspondence audio files are used for searching, in the audio file database, for one or more target audio files) may comprise a speech segment division step for dividing each of the obtained correspondence audio files into one or more speech segments so as to obtain a speech segment collection; a noise cancellation step for canceling noise (i.e. one or more speech segments that are not related to the search terms) in the speech segment collection by using the search terms; and a segment-to-speech search step for searching, in the audio file database, for the target audio files by using the noise-cancelled speech segment collection.

Next, a speech retrieval method including a noise cancellation process according to the preferred embodiment of the present invention is explained in detail.

As an example, a case, where in step S410, the obtained related documents are ranked and scored; in step S420, the obtained correspondence audio files are scored; and in step S430 of the preferred embodiment, the speech segments of the obtained correspondence audio files are scored and the noise is cancelled, is described as follows.

In step S410, ranked related documents are obtained. It should be noted that it is possible to use any conventional text retrieval methods to obtain the ranked related documents. The text retrieval method used in the present invention can search for the related documents by using the search terms, and obtain the related documents ranked in top n according to degrees of correlation between the related documents and the search terms. The degrees of correlation between the related documents and the search terms can be calculated by the text retrieval method; as an example, the BM25 method is used here for calculating the degrees of correlation. By this step, a related document list R ranked according to the calculated scores (i.e. degrees of correlation) can be obtained as follows.

$$R=[(TextId_1, Score_1), (TextId_2, Score_2), \ldots, (TextId_n, Score_n)]$$

Here, $TextId_i$ refers to the unique identifiers of the related documents, and $Score_i$ refers to the calculated scores of related documents.

In step S420, correspondence audio files corresponding to the related documents ranked in the top n are obtained and then scored. It should be noted that since there may be a case where plural related documents ranked in the top n correspond to the same correspondence audio file, the number of ultimately-obtained correspondence audio files may be smaller than n. Here, it is supposed that the number of the correspondence audio files is m and m≦n. In this way, the correspondence audio files can be scored by the following sub-steps.

1) Each of the correspondence audio files $SpeechId_j$ is given an initial score, i.e. $SpeechScore_j=0.0$.

2) As for each related document $TextId_i$ in the above-mentioned list R, its unique correspondence audio file $SpeechId_j$ is found, and then a score V given by this related document is added to the score $SpeechScore_j$ of the unique correspondence audio file $SpeechId_j$ as follows.

$$V=Score_i \times Relation_{ij}$$

$$SpeechScore_j=SpeechScore_j+V$$

Here, $Relation_{ij}$ is a parameter that refers to closeness of the relationship between the related document $TextId_i$ and the correspondence audio file $SpeechId_j$. The closer the relationship is, the greater the value of the parameter is. The value of the parameter can be determined empirically or obtained by self-learning.

3) A correspondence audio file list Rs ranked according to the score of each of the correspondence audio files is obtained as follows.

$$Rs=[(SpeechId_1, SpeechScore_1), (SpeechId_2, SpeechScore_2), \ldots, (SpeechId_m, SpeechScore_m)]$$

Here, $SpeechId_j$ refers to the unique identifiers of the correspondence audio files, and $SpeechScore_j$ refers to the scores of the correspondence audio files.

In step S430 of the preferred embodiment, a speech segment division process for obtaining a speech segment collection and a noise cancellation process for obtaining a noise-cancelled speech segment collection are carried out. In particular, step S430 of the preferred embodiment comprises a speech segment division step for dividing each of the correspondence audio files in the correspondence audio file list Rs obtained by the S402 into speech segments so as to obtain a speech segment collection. Any conventional speech segments division methods such as the above-mentioned pause-based division method and speaker-based division method, etc., can be used. As an example, the pause-based division method is used here. That is, if pause time is greater than a predetermined threshold value, the correspondence audio file is divided into speech segments at the point corresponding to the pause time. Each speech segment is given an initial score $SSScore_k$; the value of $SSScore_k$ is the score of the correspondence audio file to which this speech segment belong. In this way, an initial score list SSL of the speech segments is obtained as follows.

$$SSL=[(SSId_1, SSScore_1), (SSId_2, SSScore_2), \ldots, (SSId_k, SSScore_k)]$$

Here, $SSId_k$ refers to the unique identifiers of the speech segments, and $SSScore_k$ refers to the initial scores, of the speech segments, that stand for degrees of correlation between the speech segments and the search terms.

As an example of a method, on determining a degree-of-correlation score, the obtained speech segments $SSId_k$ are translated into texts by an auto-speech recognition engine, and then the degree-of-correlation score $TRScore_k$ between the translated speech segments $SSId_k$ and the search terms at this stage can be calculated by any conventional text retrieval methods. In this way, a degree-of-correlation score list ASRS of the speech segments is obtained as follows.

$$ASRS=[(SSId_1, TRScore_1), (SSId_2, TRScore_2), \ldots, (SSId_k, TRScore_x)]$$

Here, $TRScore_k$ refers to the scores given to the speech segments $SSId_k$ by the text retrieval method used above.

Next, final scores $SSS_k$ of the speech segments can be calculated by the following equation.

$$SSS_K=SSScore_k \times TRScore_k$$

Finally, a predetermined threshold value tr is given. If the final score of a speech segment is greater than the threshold value tr, the speech segment is reserved; otherwise the speech segment is considered noise and then cancelled from the speech segment collection. Here, the predetermined threshold value tr may be determined empirically or obtained by training.

After obtaining the noise-cancelled speech segment collection, all the speech segments in the noise-cancelled speech segment collection can be used as a search condition by which a search in the audio file database can be made with any conventional speech-to-speech search methods.

In the above-mentioned speech retrieval method including the noise cancellation process according to the preferred embodiment, the degrees of correlation between the related documents and the search terms, the closeness of the relationships between the related documents and the correspondence audio files, and the degrees of correlation between the speech segments and the search terms are considered. Therefore, by using the ultimately-obtained speech segments used for search, the initial search desire of a user can be better achieved. Further, even when the speech segments are used to search in the audio file database, the final scores of the speech segments can also be considered if degrees of correlation of the target audio files serving as the final results, which are obtained by searching in the audio file database, are evaluated.

By using the speech retrieval apparatus and the speech retrieval method described in the embodiments of the present invention, it is possible to directly convert a search condition of text format into a search condition of audio format without translation; therefore information loss and other unnecessary loss caused by the translation can be avoided. Since it is not necessary to carry out any speech recognition, negative influence caused by low accuracy of recognition can be avoided too. Further, since a speech-to-speech search is ultimately carried out, as much as possible of speech features can be retained and utilized in the speech retrieval method. Additionally, the advantage of high accuracy of text-to-text search and speech-to-speech search can be efficiently utilized. And by using the speech-to-speech search, the advantage of high recall, which may be realized in any conventional speech-to-speech systems, can be utilized too.

It should be noted that in the above-mentioned speech retrieval method including the noise cancellation process, when evaluating the degrees of correlation between the speech segments and the search terms, maybe a process of converting the speech segments into texts or converting the search terms (i.e. texts) into speech is involved; however, since the conversion is very small-scale and it is possible to use any conventional techniques to achieve the process efficiently and accurately, the process cannot exert any negative influence on the embodiments of the present invention.

In addition, the embodiments of the present invention can be executed by various approaches such as hardware, software, firmware and a combination of them, or can be embodied in computer storage media or computer programs. However, these kinds of implementation methods do not limit the technical scope of the present invention.

Further, connections among the various elements (units) in the embodiments do not limit the technical scope of the present invention either; one or more elements may include or connect to any other elements.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

The present application is based on Chinese Priority Patent Application No. 200910249847 filed on Nov. 27, 2009, the entire contents of which are hereby incorporated by reference.

What is claimed is:

1. A speech retrieval apparatus for searching, in an audio file database, for one or more target audio files by using one or more input search terms, comprising:
    a related document obtaining unit, including a processor, configured to search, in a related document database where documents related to audio files in the audio file database are stored, for one or more related documents by using the one or more input search terms;
    a correspondence audio file obtaining unit configured to search, in the audio file database, for one or more correspondence audio files corresponding to the one or more related documents obtained; and
    a speech-to-speech search unit configured to search, in the audio file database, for the one or more target audio files by using the one or more correspondence audio files obtained, wherein the speech-to-speech search unit includes:
        a speech segment division unit configured to obtain a speech segment collection by dividing each of the obtained correspondence audio files into speech segments,
        a noise cancellation unit configured to cancel noise by canceling one or more speech segments which are not related to the search terms, in the speech segment collection by using the search terms, and
        a segment-to-speech search unit configured to search, in the audio file database, for the target audio files by using the noise-cancelled speech segment collection.

2. The speech retrieval apparatus according to claim 1, wherein:
    the related documents are titles of the audio files, presentation documents of the audio files, or text contents of the audio files.

3. The speech retrieval apparatus according to claim 1, wherein:
    the search terms are one or more keywords, one or more sentences, or one or more documents.

4. The speech retrieval apparatus according to claim 1, wherein:
    the related document obtaining unit lets
    the related documents, obtained from the related document database, ranked in top n, where n is an integral number greater than zero, according to degrees of correlation between the related documents and the search terms; or
    the related documents, obtained from the related document database, having the degrees of correlation greater than a predetermined threshold value
    be the obtained related documents.

5. A speech retrieval method for searching, in an audio file database including a memory, for one or more target audio files by using one or more input search terms, comprising:
    a related document obtaining step that includes searching with a processor, in a related document database where documents related to audio files in the audio file database are stored in the memory, for one or more related documents by using the one or more input search terms;
    a correspondence audio file obtaining step that includes that includes searching, in the audio file database, for one or more correspondence audio files corresponding to the one or more related documents obtained; and
    a speech-to-speech search step that includes searching, in the audio file database, for the one or more target audio files by using the one or more correspondence audio files obtained, wherein the speech-to-speech search step includes:
        a speech segment division step that includes obtaining a speech segment collection by dividing each of the obtained correspondence audio files into speech segments,
        a noise cancellation step that includes canceling noise by canceling one or more speech segments which are not related to the search terms, in the speech segment collection by using the search terms, and
        a segment-to-speech search step that includes searching, in the audio file database, for the target audio files by using the noise-cancelled speech segment collection.

6. The speech retrieval method according to claim 5, wherein:
    the related documents are titles of the audio files, presentation documents of the audio files, or text contents of the audio files.

7. The speech retrieval method according to claim 5, wherein:
    the search terms are one or more keywords, one or more sentences, or one or more documents.

8. The speech retrieval method according to claim 5, wherein:
    the related document obtaining step lets,
    the related documents, obtained from the related document database, ranked in top n, where n is an integral number greater than zero, according to degrees of correlation between the related documents and the search terms; or
    the related documents, obtained from the related document database, having the degrees of correlation greater than a predetermined threshold value,
    be the obtained related documents.

* * * * *